(12) United States Patent
Kuratsu et al.

(10) Patent No.: US 6,224,251 B1
(45) Date of Patent: *May 1, 2001

(54) CONTINUOUS KNEADING MACHINE

(75) Inventors: Masafumi Kuratsu, Toyo; Haruyuki Nishimi, Niihama; Michiharu Toh, Fukuoka-ken; Toyohiko Gondoh, Kurume, all of (JP)

(73) Assignee: Sumitomo Heavy Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,072

(22) Filed: Mar. 29, 1999

(30) Foreign Application Priority Data

Mar. 31, 1998 (JP) .................................................. 10-103817

(51) Int. Cl.[7] ........................................................ B29B 7/46
(52) U.S. Cl. ................................ 366/84; 366/97; 366/300
(58) Field of Search ................................ 366/83, 84, 85, 366/88, 300, 301, 97; 425/204, 208, 209

(56) References Cited

U.S. PATENT DOCUMENTS

| 561,298 | * | 6/1896 | Werner . |
|---|---|---|---|
| 2,441,222 | | 5/1948 | Fuller . |
| 2,694,256 | * | 11/1954 | Coon, Sr. et al. . |
| 3,082,816 | | 3/1963 | Skidmore . |
| 3,610,585 | * | 10/1971 | MacLeod et al. . |
| 4,084,263 | * | 4/1978 | Millauer . |
| 4,456,381 | * | 6/1984 | Inoue et al. . |
| 4,714,350 | * | 12/1987 | Nortey . |
| 4,834,543 | | 5/1989 | Nortey . |
| 5,332,308 | | 7/1994 | Scheuring . |
| 5,372,418 | | 12/1994 | Bisenberger et al. . |
| 5,429,489 | | 7/1995 | Geyer . |

FOREIGN PATENT DOCUMENTS

| 10 45 079 | 11/1958 | (DE) . |
|---|---|---|
| 1 432 024 | 8/1969 | (DE) . |
| 1 132 581 | 3/1957 | (FR) . |
| 8-24833 | 3/1996 | (JP) . |

* cited by examiner

Primary Examiner—W. L. Walker
Assistant Examiner—David Sorkin
(74) Attorney, Agent, or Firm—Arent Fox Kintner Plotkin & Kahn, PLLC

(57) ABSTRACT

A continuous type kneading machine comprising a chamber formed by a pair of parallel cylindrical cavities communicated with each other at their sides and a pair of rotatable rotors housed in disengaging state in the cavities, wherein each of the rotors is formed in a blade form having a spiral angle and a constant cross section in the axial direction, and directions of the spiral angles of the rotors in the cavities are opposite to each other and a phase difference in the axial direction during rotation of the rotors is kept at constant.

2 Claims, 7 Drawing Sheets

CONTINUOUS KNEADING MACHINE

BACKGROUND OF THE INVENTION

The present invention relates to a kneading machine or a mixing machine in which two rotors are respectively housed in two cavities of a chamber.

Heretofore, as an apparatus for kneading natural or synthetic rubber or for mixing and kneading the rubber and various kinds of additive agents to disperse them uniformly in the rubber, or for mixing and kneading various thermoplastic elastomer or high viscous fluid with powder material or liquid material, or for dispersing materials, has been known a kneading machine in which blade-like rotors are rotatably supported within a sealed container (chamber) and kneading objects put into the chamber are moved from the axial direction of the rotor to the radial direction of the rotor to be circulated. For example, in the sealed type kneading machine disclosed in JP-A-8-24833 (corresponding to U.S. Pat. No. 4,834,543), spiral blades having spiral angles extending in the same direction are respectively formed on circumferences of shafts of two rotors and the two rotors are respectively arranged in disengaged condition in two parallel cylindrical cavities communicated with each other at their side faces. The rotors are rotated in opposite directions and the kneading objects are moved in the axial direction in each of the cavities and are interchanged between the cavities.

FIG. 7 is a side view showing the rotors described in the above described Patent Document, and FIGS. 8–10 are schematic views showing flows of the kneading objects in the kneading machine in which the rotors are incorporated. A pair of rotors 1 are horizontally arranged in the right and left cavities of the chamber 3 of the kneading machine with a predetermined distance between them while keeping parallel relationship with each other. Neck portions of the shafts of the rotors 1a are rotatably supported by both sides of the chamber 3, and end portions of the rotor shaft at one side are connected to a drive motor via a gear system (not shown). The rotors are rotated in the opposite directions at the same speed. These rotors 1 each are formed with a long blade 5 and a short blade 6 extending in the axial direction with a predetermined spiral angle. The rotors are assembled in the machine to shift phases of rotating angle so that the rotors cannot interfere with each other at rotation and in the example, the rotors are assembled in the machine with a phase difference 90° at a position.

In this example, the spiral directions of the blades of the right and left rotors 1 are the same. Therefore, when the rotors 1 are rotated in opposite directions, the movements of the kneading objects in the axial direction in the respective cavities 2 become opposite direction as schematically illustrated in FIGS. 8 and 9, so that the movement of the kneading objects in the axial direction in the cavities becomes good condition. Further, interchanging of the kneading objects are performed near the end of both cavities 2 in the axial direction.

Kneading machines of the above described type in which spiral directions of the blades portions of the right and left rotors are the same and the rotors are rotated in opposite directions can improve the movability of the kneading objects in the axial direction in the chamber. However, when an operation in which the raw materials of kneading objects are continuously supplied into the chamber and simultaneously the product is simultaneously taken out from a discharge outlet of the chamber, so-called continuous operation, is performed, resulted is a disadvantageous phenomenon, so-called short pass, in which the raw materials entered a material supply inlet of the chamber immediately move to the discharge outlet without being uniformly mixed in the radial direction (see FIG. 10) because of the high movability in the axial direction of raw materials, so that uniformly kneaded product cannot be obtained. Therefore, the conventional kneading machines can do only batch treatment, and they have a problem on the productivity.

Further, in the conventional kneading machines, because the right and left rotors of which spiral directions of the blade portions the rotors are the same are rotated in opposite directions, phases of the right and left rotors during rotation are shifted at the positions in the axial direction. Therefore, quantity of interchanging of the kneading objects between the cavities in the chamber changes. In case where the length of the chamber in the axial direction is short, the phase shift is limited to a small range and its influence is negligible. However, in case of the length of the chamber in the axial direction is longer, i.e. the ratio L/D of the length L with the diameter D of the chamber is larger, its influence cannot be ignored.

SUMMARY OF THE INVENTION

An object of the present invention is to provide a continuous type kneading machine, wherein a quantity of movement of kneading objects in a chamber in the axial direction and a quantity of interchanging of the kneading objects between cavities in the chamber are kept in a balanced condition, whereby a continuous treatment of the kneading objects can be conducted.

Another object of the present invention is to provide a continuous type kneading machine, wherein the degree of dispersion of the kneading objects in radial direction of the chamber, that is, the degree of dispersion of the kneading objects at the center portion of the chamber having a pair of cavities (communicating portion between the cavities) and at both sides of the chamber can be uniformed in a short time.

According to the present invention, it is provided a continuous type kneading machine comprising a chamber formed by a pair of parallel cylindrical cavities communicated with each other at side faces thereof and a pair of rotatable rotors housed in the cavities in disengaging state with each other, wherein each of the rotors is formed in a blade form having a spiral angle and a constant cross section in the axial direction, and directions of the spiral angles of the rotors in the cavities are opposite to each other and a phase difference in the axial direction during rotation of the rotors is kept at constant.

DETAILED DESCRIPTION OF THE PREFERRED EMBODIMENTS

Figure 1:
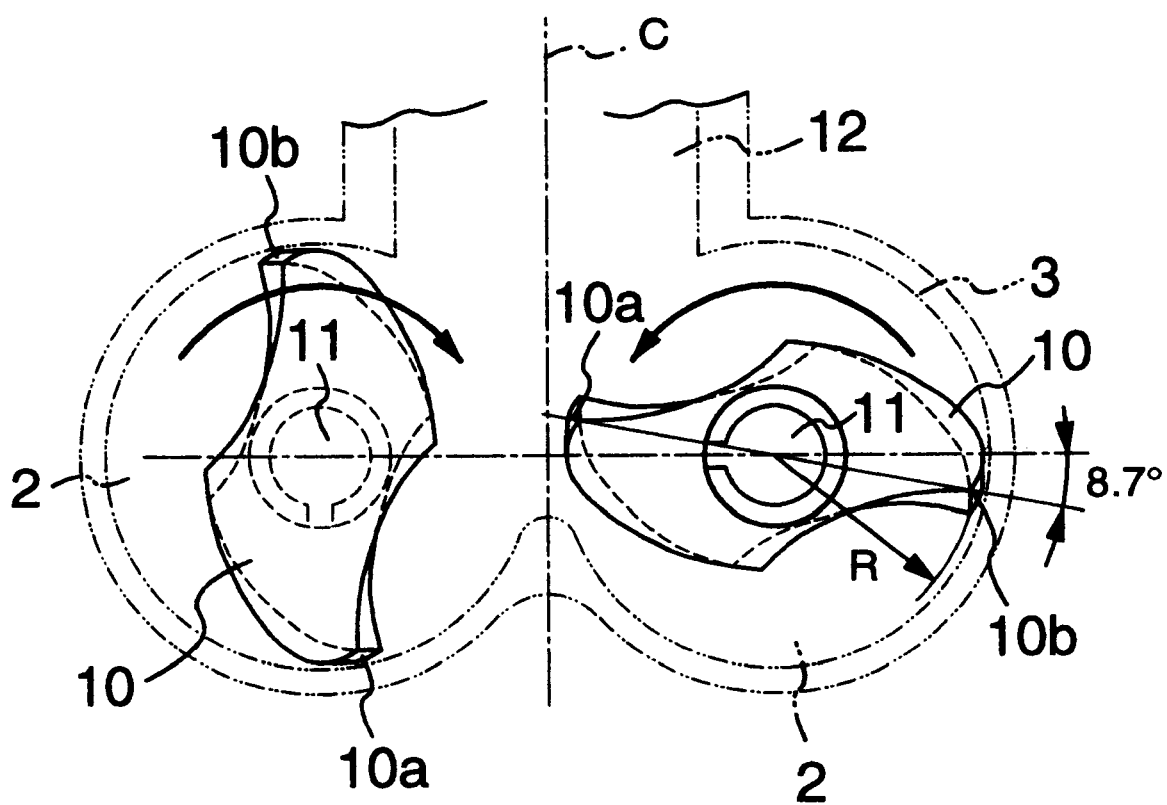
FIG. 1 is a front view of rotors of an embodiment of a continuous type kneading machine according to the present invention.

Hereinafter, a preferred embodiment according to the present invention is described referring to the drawings.

Referring to FIG. 1, a pair of rotors 10 with rotor shafts 11 rotatably supported by a chamber 3 is housed in a pair of cavities 2 of the chamber 3. By rotation of the rotor shafts 11, the rotors 10 are rotated in opposite directions, more specifically, they are rotated so that their facing sides (inner side) rotate from upper to lower. As shown in FIG. 1, each of rotors 10 is formed with blades 10a, 10b projected in the diametrical direction and extending over the entire length thereof, and these blades are spirally twisted in the axial direction with a constant angle. FIG. 1 shows the rotors of which spiral angle is 8.7°.

Each of the rotors 10 has a configuration of which sectional form perpendicular to its axis is the same in the axial direction, and spiral angles of the blades 10a, 10b in the axial direction of the right and left rotors 10 are opposite to each other. The rotors 10 are arranged in the cavities 2 to have a phase difference of 90° viewed from the axial direction. As illustrated in the figures, radius R of rotation of the rotors 10 is of the length close to a center C of the chamber 3.

Figure 2:
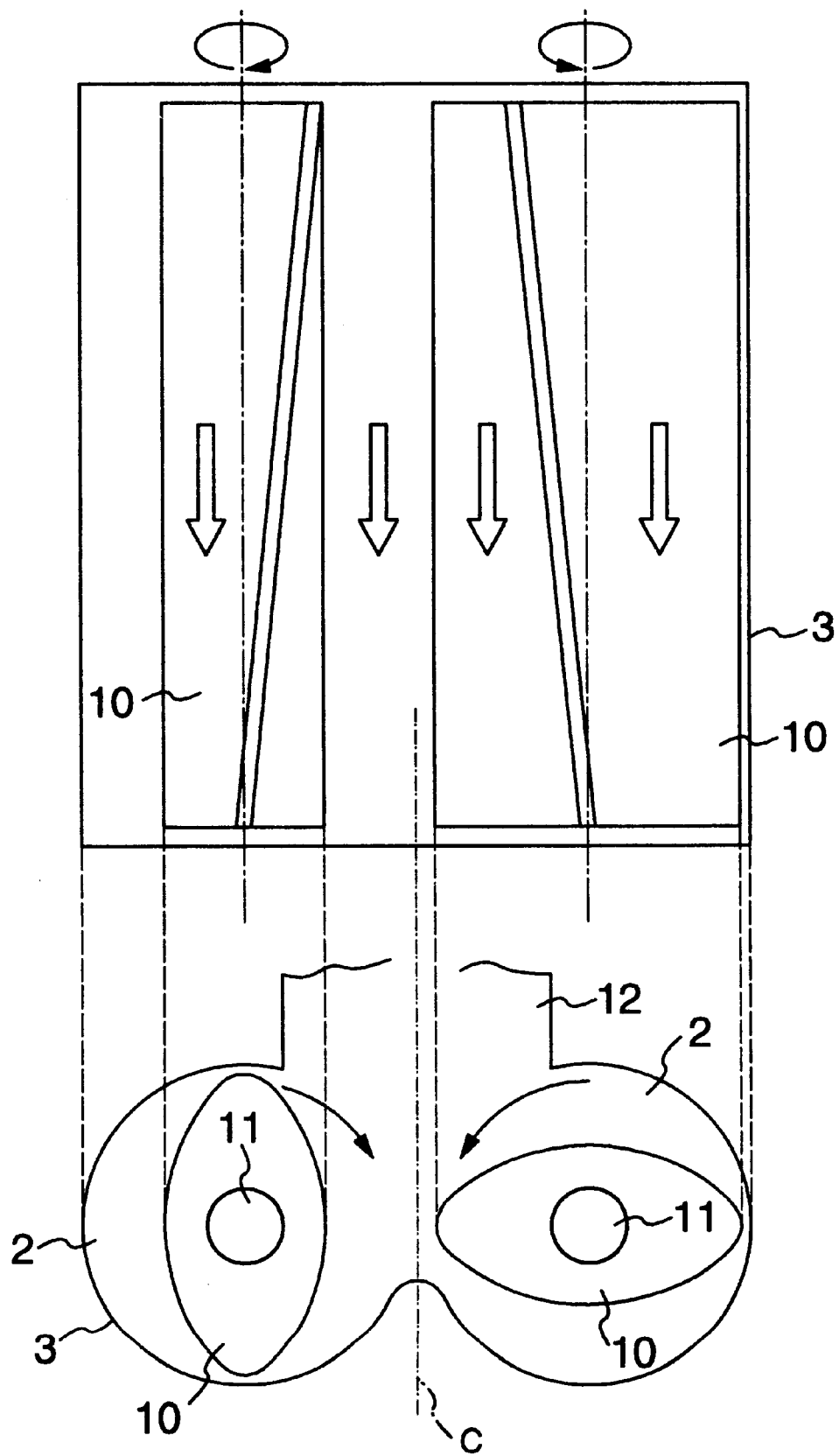
FIG. 2 is a schematic view showing flow of kneading objects in the embodiment of the kneading machine according to the present invention.
Figure 3:
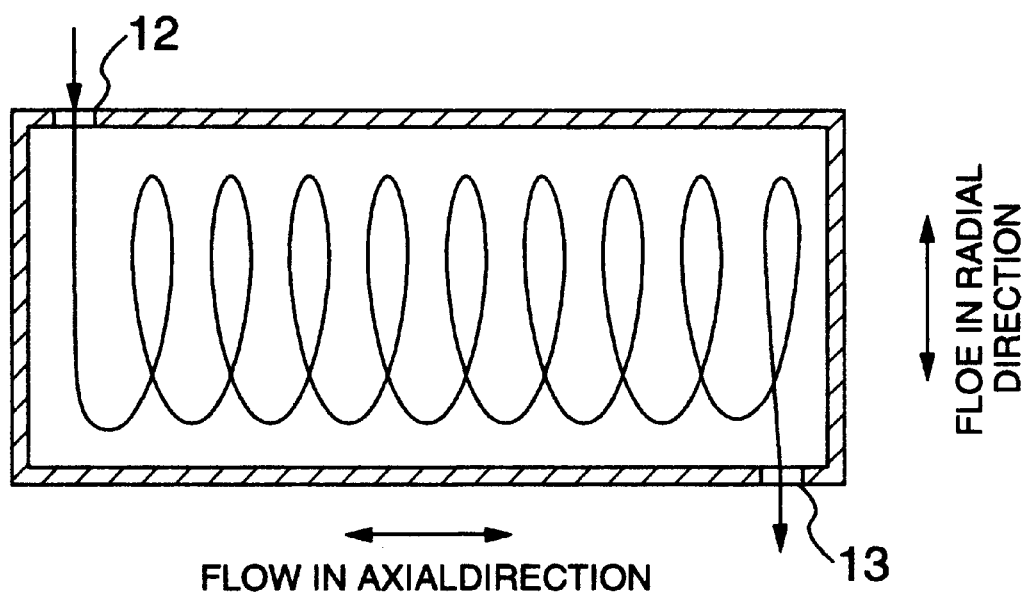
FIG. 3 is a schematic view showing flow of the kneading objects from an inlet to an outlet of the embodiment of the kneading machine according the present invention.

With this structure, when materials to be kneaded are supplied from an inlet 12 at center of an upper part of the chamber 3 and the right and left rotors 10 are rotated in opposite directions, the kneading objects are moved in the axial direction of the rotors 10 and in the same direction by feeding action of the blades 10a, 10b of each of the rotors 10 (see FIG. 2). At this time, the phase difference of the right and left rotors 10 during rotation is kept at constant in the axial direction and is 90° at any cross section of the rotors, and therefore, the movement in the axial direction and in the radius direction, i.e. interchanging of the kneading objects between the cavities 2 is made at the same time. The interchanging of the kneading objects between the cavities becomes always constant in the axial direction, and as shown in FIG. 3, the kneading objects are spirally moved so as to draw a spiral from one end of the chamber (inlet 12) to the other end (discharge outlet 13). By adequately adjusting a quantity of the kneaded objects taken out from the discharge outlet 13, flow of the kneaded objects in the chamber 3 becomes plug-flow to move at a constant speed while keeping the uniformity in the axial and radial directions. Even when the materials are continuously supplied from the inlet 12, a short pass which has been occurred hitherto never occur and good kneaded objects is taken our from the discharge outlet 13. Moreover, the spiral angle of rotors is preferable to be within 5° to 30°, in view of keeping the balance of movements in the axial and radial directions.

Figure 4:
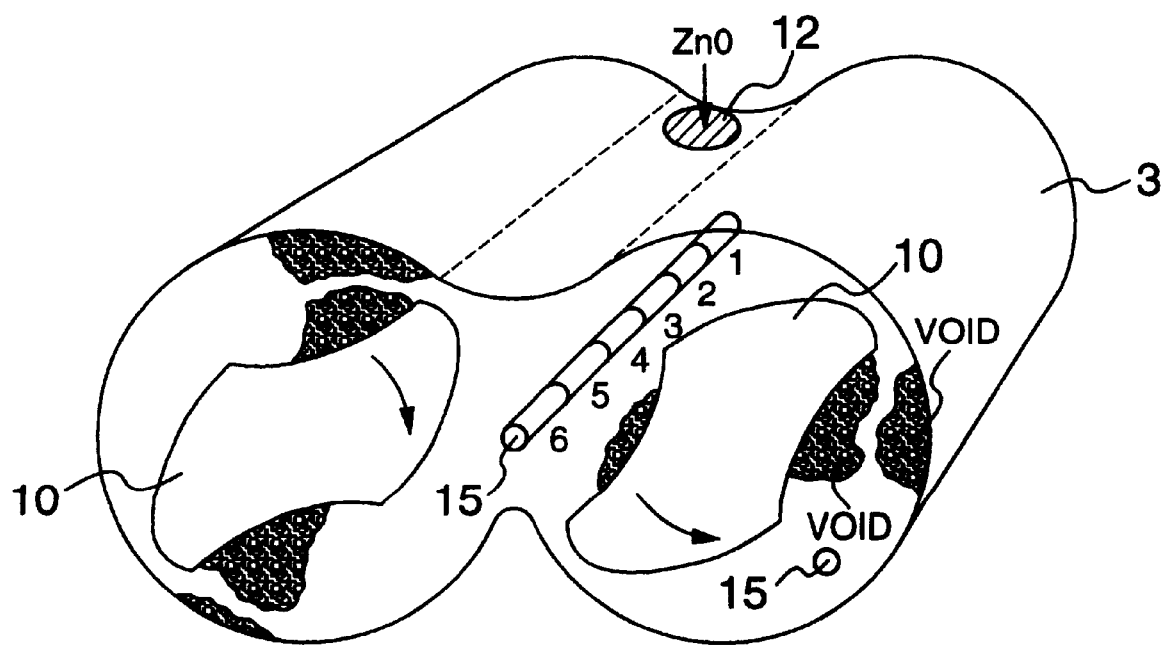
FIG. 4 is a perspective sectional view showing a sealed type biaxial mixing machine according to the present invention at dispersion test.

FIG. 4 is a perspective sectional view showing a closed type biaxial kneading machine according to the present invention in case of dispersing and mixing the zinc white (ZnO) with the synthetic rubber (butadiene).

Figure 5:
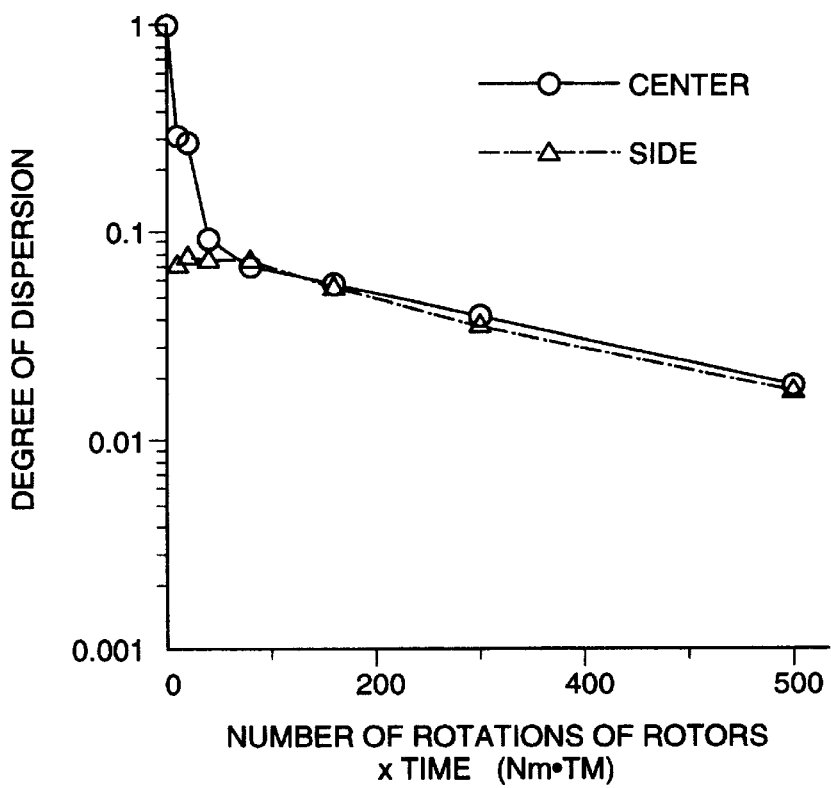
FIG. 5 is a graph showing result of the dispersion test of a mixture according to the present invention.
Figure 6:
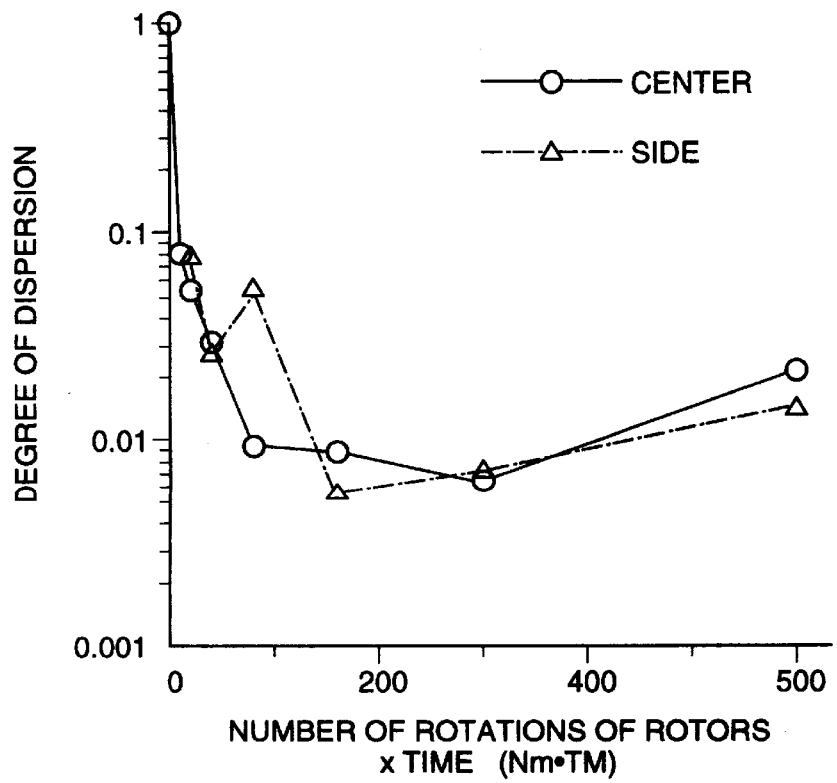
FIG. 6 is a graph showing result of the dispersion test of a mixture according to a conventional mixing machine.
Figure 7:
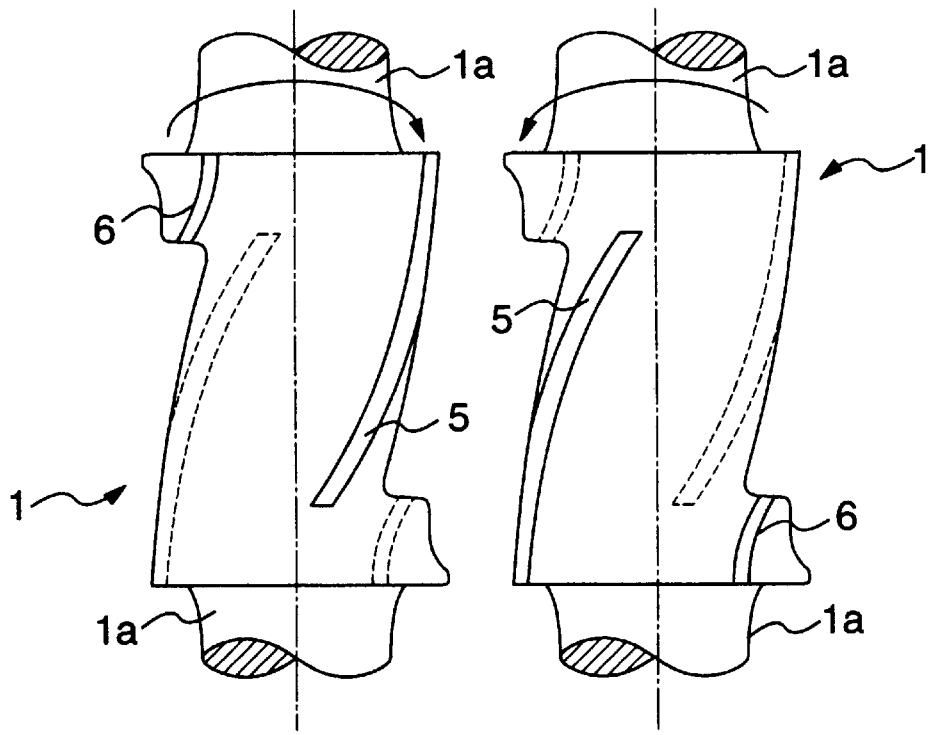
FIG. 7 is a side view of rotors of a conventional batch type kneading machine.
Figure 8:
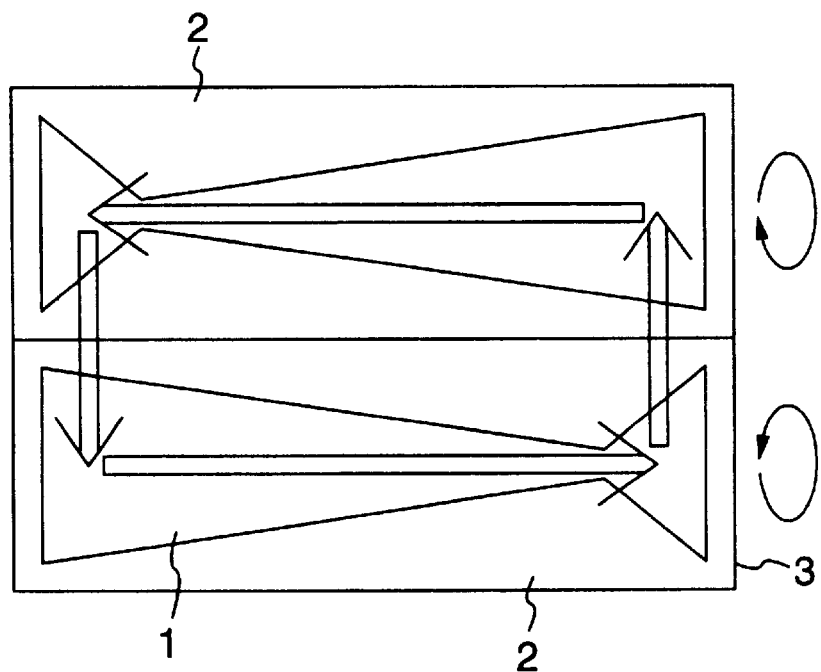
FIG. 8 is a schematic view showing flow of the kneading objects in a kneading machine in which conventional rotors are assembled.
Figure 9:
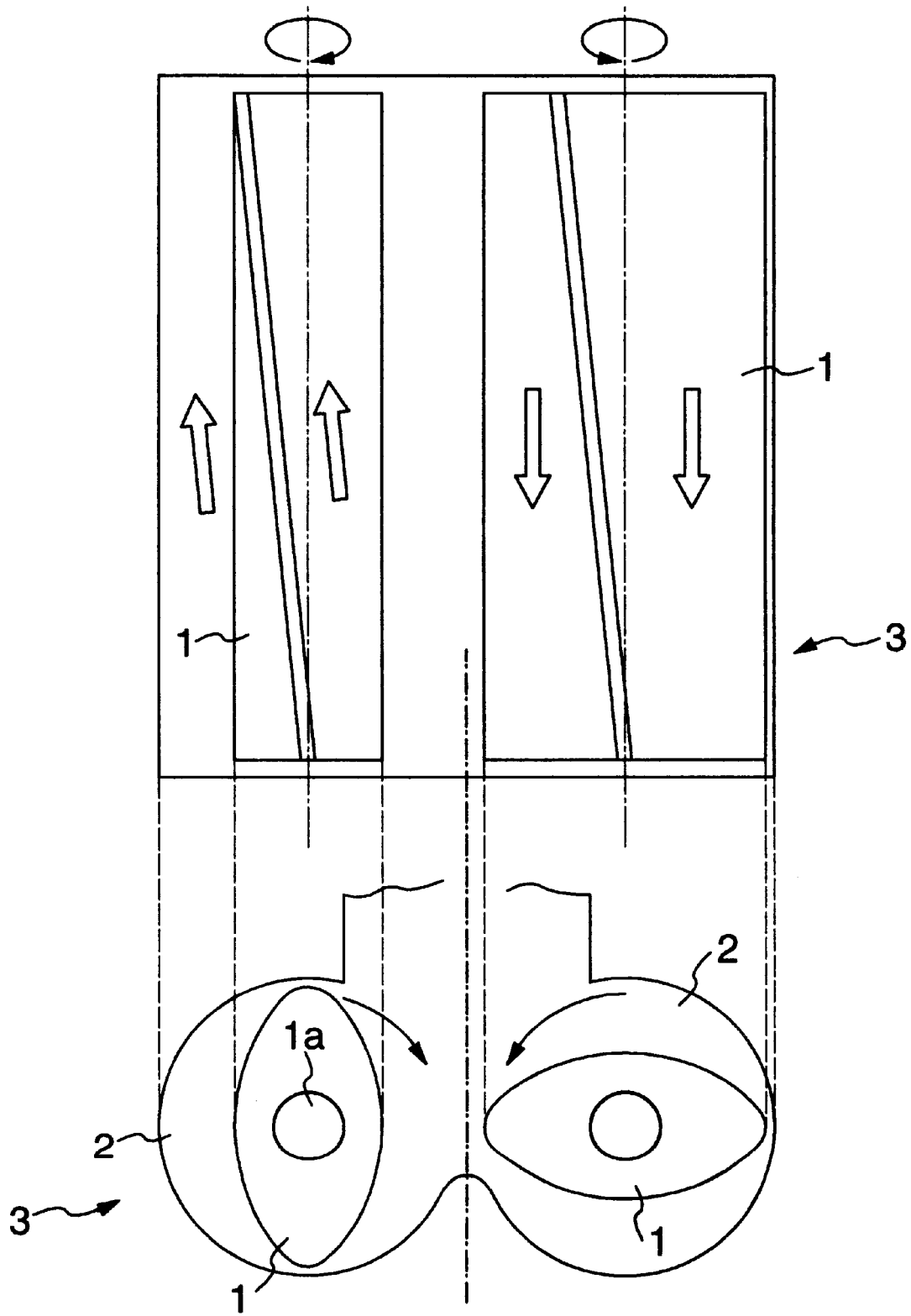
FIG. 9 is a schematic view showing flow of the kneading objects in a conventional kneading machine.
Figure 10:
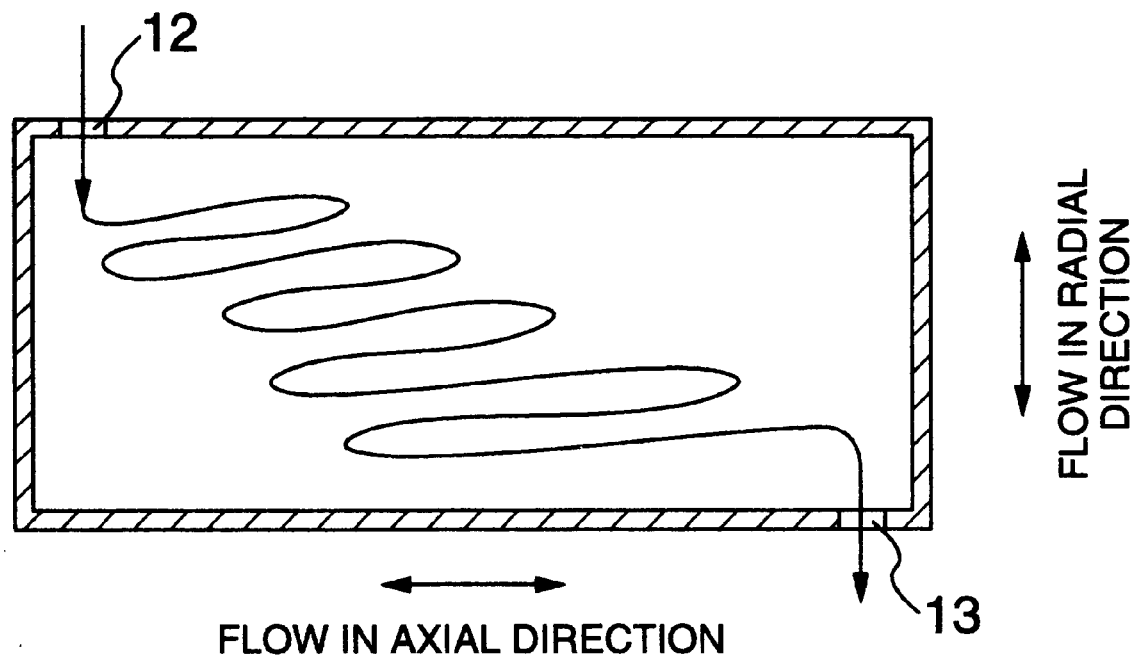
FIG. 10 is a schematic view showing flow of the kneading objects from an inlet to an outlet in a conventional kneading machine.

Sample rubber and zinc white are put into the machine from a material inlet 12 and a pair of rotors 10 having spiral angles extending in opposite directions are rotated in opposite directions in the cavities 2. Mixed sample is taken out from sampling tubes 15 at the center and on the side of the chamber. The degree of dispersion of zinc white in the axial direction is evaluated together with passage of time. FIG. 5 is a graph showing test result of dispersion of mixtures according to the present invention and FIG. 6 is a graph showing test result of dispersion of a conventional mixing machine using the rotors with spiral angles extending in the same direction. In the drawings, white round marks show the degree of dispersion at the center of the chamber, triangle marks show the degree of dispersion at the side of the chamber. As it is obvious from the comparison of these test results, it is found that the degree of dispersion at the center and at the side of the chamber the continuous type kneading machine according to the present invention become uniform faster than the conventional machine. This exhibits that the rotors having spiral directions in opposite directions progresses interchanging of the mixture between the cavities better than conventional rotors and the flow of the mixtures is close to the plug flow, and also it shows that in the continuous mixing operations a short pass at the discharge outlet will arise so rarely by the flow like a plug flow.

As described above, according to the present invention, by making spiral directions of blades of a pair of rotors in the chamber in opposite directions, a short pass of the kneading objects at a discharge outlet can be prevented, interchanging of the kneading objects between the cavities of the chamber becomes always constant, the uniformity and dispersibility of the kneading objects in the radial direction can be improved, the continuous kneading treatment for continuously supplying and taking out the materials can be done, great effects in improving the productivity of kneading objects and in reducing the cost are obtained.

What is claimed is:

1. A continuous type kneading machine comprising a chamber formed by a pair of parallel cylindrical cavities communicated with each other at their sides and a pair of rotatable rotors housed in a non-intermeshing state in the cavities, wherein each of the rotors comprises two blades diametrically opposite to each other and having a spiral angle in the axial direction, a barrel portion, and a constant cross section in the axial direction such that each blade extends over an entire length of the barrel portion, wherein all blades on a given rotor twist in the same spiral direction, wherein directions of the spiral angles of the rotors in the cavities are opposite to each other and a phase difference between the rotors during rotation of the rotors is kept constant, wherein the rotors rotate in opposite directions relative to each other and said spiral angle is in a range between 5 degrees to 30 degrees.

2. A kneading machine according to claim 1, wherein said phase difference is 90°.

* * * * *